BEST AVAILABLE COPY 100-142

P. K. DEDERICK.
Baling-Press.

Re No. 8,737. Reissued June 3, 1879.

,737. BALING-PRESSES. Peter K. Dederick, Albany, N. Y. Patent No. 151,203, dated May 26, 1874. Filed June 17, 1878.

*Brief.*—The hay is pressed down forward of the plunger by a feed-arm operated by the plunger. A blade is secured to the plunger or frame, or to both, trim the hay overlapping the plunger as it is pushed into the baling-chamber. pring retaining devices are used, as also ribs or corrugations, to prevent the retraction of the hay by the plunger.

*Claim.*—1. The feed-arm J, operated from the plunger D through the medium of the roller L, spring M, and connecting-strap, substantially as described.

2. The plunger D, extended toggle or toggle-lever E, and arms F, in combination with the crank G and connecting-rod I, for the purpose set forth.

3. Hooked-end retainers arranged at the side of the baling-chamber, with their hooked ends projecting into said chamber at or near the feed end thereof, for the purpose specified.

Fig 1

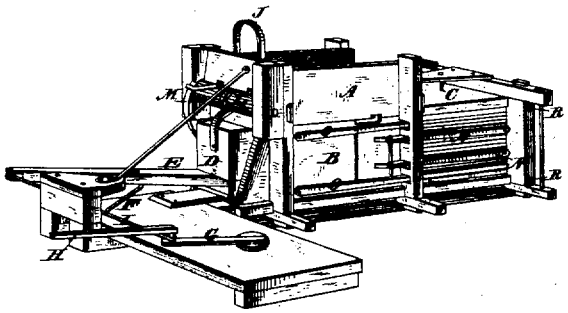

Fig 2.

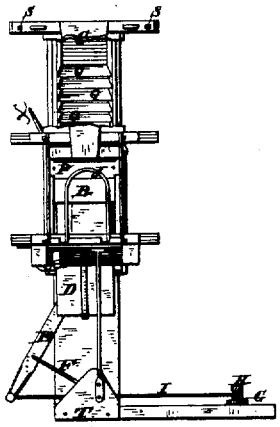

Witnesses.
Harry King
W. C. Jirdinston

Inventor.
Peter K. Dederick
By L. Hill.
His atty.

N. PETERS, PHOTO-LITHOGRAPHER, WASHINGTON, D. C.

Search Room

UNITED STATES PATENT OFFICE.

PETER K. DEDERICK, OF ALBANY, NEW YORK.

IMPROVEMENT IN BALING-PRESSES.

Specification forming part of Letters Patent No. 151,203, dated May 26, 1874; Reissue No. 8,737, dated June 3, 1879; application filed June 17, 1878.

*To all whom it may concern:*

Be it known that I, PETER K. DEDERICK, of Albany, Albany county, New York, have invented a new and useful Improvement in Baling-Presses, of which the following is a specification.

My invention consists of certain improvements in self-feeding presses for hay, &c., of the class on which I filed applications April 22 and August 2, 1872; and consists in extending one joint of the toggle so as to form a toggle-lever, and of operating it by a crank connected to the end of said lever; and also in the automatic feed-arm, and the manner of its operation; also, in the form of the retaining guards or barbs.

My machine may be used either horizontally or perpendicularly without change, except in the position of the crank or horse-power.

Figure 1 is a perspective view, showing the machine as horizontal. Fig. 2 illustrates the machine as upright, the entire press being the same, and with part of side or top, if horizontal, broken out.

In both figures, A is the hopper; B, the press-box; C, the bale-chamber; D, the plunger. E and F are toggle-arms, the former being extended as a lever to operate them by; G, the crank; H, the sweep or horse-lever, and I the connecting-rod between the horse-power and the power of the press. J is an automatic feed-arm, operated by the plunger D through means of the roller L, which forms its bearings or journals, and spring M, attached to the frame and to the roller, to rotate the roller backward, and a connecting-strap, attached by one end to the plunger, and by the other end to the roller, as shown, to rotate the roller and feed-arm forward.

In Fig. 1, N are spring-retaining hooks attached to the sides of the baling-chamber, with their support near the discharge end of the press, and their hooked or barbed end projecting into the baling-chamber at or near the feed end thereof, so as to hook into and retain the hay or other material therein, and prevent it from backing into the press-box. O are supplemental spring-retainers, for the same purpose, attached to the side of the press-box, with their support near the feed end thereof, and their free end extending into the feed-box or baling-chamber at or near the line where said two chambers communicate with each other.

The two forms of spring-retainers differ in this respect, that the retainers O, by their mode of support and arrangement on the side of the press-box, are put into compression by the pressure of the hay against their retaining end, whereas the hooked retainers N, by their peculiar attachment and arrangement on the side of the baling-chamber, are put in tension by the pressure of the hay which they retain, and therefore are in no danger of bending or buckling.

In Fig. 2, P is the blade to trim the hay overlapping the plunger, and may be secured either to the frame or plunger, or to both. The discharge end of the press is constructed adjustably both ways, so as to admit of being screwed up to impinge the bale both ways by turning the nuts R R, Fig. 1, and S S, Fig. 2.

In operation, the hay is pitched into the hopper A, and the plunger withdrawn by the crank G through means of the toggle-lever, E, arms F, and connecting-rod I, thus turning the roller L and moving the arm J down on the hay, and forcing it into the press-box B, from whence it is forced into the bale-chamber C by the plunger and toggle-lever operated by the crank. The hay overlapping the plunger is cut off by the blade P, Fig. 2, thus making a smooth side to the bale. Thus the operation is continued, and the pressed sections retained from expanding back by the guards N N O O, Fig. 1, and ribs or corrugations, as shown at Q, Fig. 2, either separately or all combined. After pressing the first bale it is tied off in the usual manner through the slots in the box, and is then used as a head to press the next bale against, and is thus moved forward and discharged from the press.

In using this machine upright, as in Fig. 2, it is placed on the end T, this being the bottom, and S the top. If desired, the frame may be like that of the presses in ordinary use.

The operation is exactly similar as when used horizontally, except that the hay is forced upward and the bale discharged from the top S, which would make it convenient for stowing the bales in high places. The feed-arm may be hinged at the upper side of the feed-orifice, if desired, in vertical presses.

Having thus described my invention, I claim as follows:

1. The feed-arm J, operated from the plunger D through the medium of the roller L, spring M, and connecting-strap, substantially as described.

2. The plunger D, extended toggle or toggle-lever E, and arms F, in combination with the crank G and connecting-rod I, for the purpose set forth.

3. Hooked-end retainers arranged at the side of the baling-chamber, with their hooked ends projecting into said chamber at or near the feed end thereof, for the purpose specified.

PETER K. DEDERICK.

Witnesses:

C. M. CHURCH,

WILLIAM BLACKSTOCK.